Figure 1:
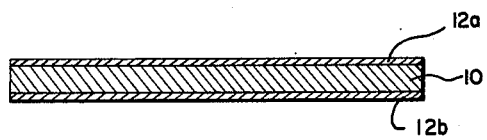

Feb. 2, 1965   W. D. FINNEGAN ETAL   3,168,381

ALUMINUM ALLOY AND ARTICLE

Filed Sept. 1, 1960

INVENTORS
WALTER D. FINNEGAN
MALCOLM J. FINLAYSON

BY *James E. Toomey*

ATTORNEY

3,168,381
ALUMINUM ALLOY AND ARTICLE
Walter D. Finnegan, Spokane, and Malcolm J. Finlayson, Veradale, Wash., assignors to Kaiser Aluminum & Chemical Corporation, Oakland, Calif., a corporation of Delaware
Filed Sept. 1, 1960, Ser. No. 53,452
6 Claims. (Cl. 29—197.5)

The present invention relates to aluminous structures that are prepared for brazing to other aluminous structures. More particularly, the present invention relates to aluminous structures, i.e. structures of aluminum or aluminum base alloys upon which a layer, or layers, of an aluminum alloy has been preplaced so that by exposure to predetermined elevated temperatures the structures may readily be brazed to other aluminous structures.

Conventional assemblies of this type are vulnerable to attack by corrosion. For instance, articles assembled in the described manner from aluminous sheets provided with integral claddings of an aluminum brazing alloy, failed after short periods of time, especially when exposed to liquids containing heavy metal salt, in that they developed perforations. Obviously, the cladding of aluminum brazing alloy did not protect the structural aluminum members anodically against corrosion in highly corrosive environments. This has limited the use of brazed aluminous assemblies severely; for instance, it has made it impractical to construct radiators from aluminum sheets provided with aluminum brazing alloy claddings.

It is the primary purpose of this invention to provide an aluminum brazing alloy, for application to structural aluminous members, that is capable of anodically protecting the member to which it is applied against corrosion even when the member is used in highly corrosive environments and to provide an aluminous brazing structure employing such alloy, said structure exhibiting great resistance to corrosion even when used in contact with fluids containing heavy metal salts.

It has been found that when from 1.5% to 2.0% by weight of zinc is incorporated within aluminum base alloys containing from 6.8% to 8.2% by weight of silicon, and the resultant alloy is applied in the form of an integral layer to the surface of an article made from a structural aluminous material, such as an aluminum base alloy containing about 1.0% by weight of manganese, this layer protects the structural aluminous article effectively against electrolytic corrosion and is in itself highly resistant to corrosion, i.e. is only very slowly consumed during practical use of the composite article even when exposed to highly corrosive environments, such as fluids containing heavy metal salts. Moreover, the layer has a brazeability that is at least equal, and in many respects superior, to the brazeability of conventional aluminum brazing alloys.

It has been found that additions of zinc in amounts less than 1.5% fail to adequately protect the structural core member anodically, and additions of zinc in amounts larger than 2.0% reduce the alloy's resistance to general corrosion attack so that it is consumed at an excessive rate and no longer present to protect the structural aluminum member.

It has also been found that in the event the assembly is to be used in very highly corrosive environments, it is desirable that a protective layer of a suitable aluminum alloy be interposed between the structural member and the layer of brazing alloy. Thus, the structural member may first be coated with a protective layer of an aluminum base alloy such as one containing from 0.8 to 1.3% zinc, and then the layer of brazing alloy in accordance with the invention is superposed upon said protective layer. In this connection it is important, however, that the composition of the intermediate alloy layer be less anodic relative to the structural member than the outer layer of brazing alloy, otherwise it might react anodically in both directions, i.e. with regard to (1) the structural aluminous member and (2) the layer of brazing alloy. This would lead to a rapid consumption of the intermediate layer causing the outer layer of brazing alloy to be undermined. Such undermining creates sites where concentration cells can become active and implement destruction of the member by crevice corrosion phenomena.

Figure 2:
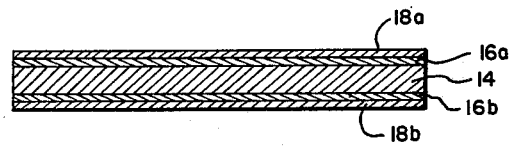

In the accompanying drawing,
FIGURE 1 illustrates a cross-section through an embodiment of the invention wherein a structural aluminous sheet is provided on either side with a layer of a brazing alloy constructed in accordance with the invention; and
FIGURE 2 illustrates a cross-section through another embodiment of the invention wherein a structural aluminous sheet has both its surfaces covered by two superposed layers of aluminum alloys.

Having first reference to FIGURE 1, the reference numeral 10 indicates a structural sheet of aluminum or aluminum base alloy such as an aluminum alloy containing, by weight, from 1.0 to 1.5% manganese and impurities of no more than 0.6% silicon, 0.7% iron, 0.2% copper, 0.1% zinc, and no more than 0.15% of other impurities, balance aluminum. Bonded to each of the surfaces of the structural sheet 10 is a layer or cladding 12a and 12b, respectively, of an aluminum brazing alloy in accordance with the invention such as one containing, by weight, 6.8 to 8.2% silicon, 1.5 to 2.0% zinc, impurities of no more than 0.8% iron, 0.25% copper, 0.10% manganese, and 0.15% total others, balance aluminum.

In a practical embodiment of the invention, the sheet 10 was made of an aluminum base alloy consisting, by weight, of 1.17% manganese, 0.19% silicon, 0.61% iron, 0.11% copper, 0.01% magnesium, 0.01% chromium, 0.08% zinc, 0.01% titanium, balance aluminum. The layers 12a and 12b were made of aluminum brazing alloy consisting, by weight, of 7.83% silicon, 1.84% zinc, and as impurities 0.37% iron, 0.03% copper, 0.008% manganese, 0.01% chromium and 0.008% titanium, balance aluminum. The total thickness of the composite sheet was 0.014 inch with about 10% thereof provided by each of the layers 12a and 12b on either side of the structural sheet. The claddings 12a and 12b may be applied, and bonded, to the structural sheet in any suitable manner of operation, such as by rolling, dipping, or casting, all of which are well known in the art.

The described embodiment of the invention exhibited excellent brazeability forming dependable brazing fillets without leaving any area of the structural sheet unprotected. When exposed to heavy metal salt solutions, such as Altoona water at a temperature of about 25° C., for periods of as long as 350 hours, no perforations developed, no harmful anodic corrosion could be observed in the structural sheet, and no excessive disintegration of the claddings had occurred.

In the embodiment of the invention illustrated in FIGURE 2, the reference numeral 14 indicates a structural sheet which may be of the same compositions as the sheet 10 in the embodiment of the invention illustrated in FIGURE 1. Applied to the upper and lower surfaces of said sheet 14 are thin layers 16a and 16b of an aluminum alloy containing 0.8 to 1.3% by weight of zinc, and as impurities no more than 0.7% silicon and iron total, 0.10% copper, 0.10% manganese, 0.10% magnesium, and no more than .15% of other impurities, balance aluminum. Superposed upon the outer surfaces of layers 16a and 16b are thin covering layers 18a and 18b, respectively, of a brazing alloy having the same composition as the alloy from which the layers 12a and 12b in the embodiment of the invention illustrated in FIGURE 1 are constituted. In a practical embodiment of the invention as illustrated in FIGURE 2, the total thickness of the composite sheet was 0.014 inch of which 5% were provided by the intermediate layers 16a and 16b and 10% by the covering layers 18a and 18b. Such structural sheet is characterized by excellent brazability and no perforations or harmful pitting developed during prolonged endurance tests in Altoona water.

While the specific examples set forth above involve applying the alloy of the invention to both sides of the structural member, it will be apparent the alloy need be applied to one side only in some instances.

As used in the specification and claims, the term "aluminous" is intended to mean aluminum and aluminum base alloys. By "aluminum base alloy" is meant an alloy containing over 80% by weight aluminum.

It will be understood that various changes, omissions and additions may be made to this invention without departing from the spirit and scope thereof as set forth in the appended claims; wherein what is claimed is:

1. An aluminous brazing structure having a core of a structural aluminous material, and applied to a surface thereof a covering layer of a different aluminum base alloy consisting essentially, by weight, 6.8 to 8.2% silicon and from 1.5 to 2.0% zinc.

2. An aluminous brazing structure having a core of a structural aluminous material, and applied to a surface thereof a covering layer of a different aluminum base alloy consisting essentially of, by weight, 6.8 to 8.2% silicon, 1.5 to 2.0% zinc, impurities of no more than 0.8% iron, 0.25% copper, 0.10% manganese and 0.15% others, balance aluminum.

3. An aluminous brazing structure comprising a core of a structural aluminous material, a first layer of a different aluminum base alloy applied to a surface of said core, and a covering layer of a different aluminum base alloy consisting essentially, by weight, 6.8 to 8.2% silicon and from 1.5 to 2.0% zinc, disposed over said first layer.

4. An aluminous brazing structure comprising a core of a structural aluminous material, a first layer of an aluminum base alloy applied to a surface of said core, and a covering layer of an aluminum base alloy consisting essentially, by weight, 6.8 to 8.2% silicon and from 1.5 to 2.0% zinc disposed over said first layer, the composition of the alloy of said first layer being such as to be less anodic relative to said core member than the alloy of said covering layer.

5. An aluminous brazing structure comprising a core of a structural aluminous material, a first layer of a different aluminum base alloy consisting essentially from 0.8 to 1.3% by weight of zinc applied to a surface of said core, and a covering layer disposed over said first layer, said covering layer being of an aluminum base alloy consisting essentially of from 6.8 to 8.2% by weight of silicon and from 1.5 to 2.0% by weight of zinc.

6. An aluminous brazing structure comprising a core of a structural aluminous material, a first layer of a different aluminum base alloy consisting essentially, by weight, of 1 to 1.5% maganese and impurities of no more than 0.6% silicon, 0.7% iron, 0.2% copper, 0.1% zinc, 0.15% others total, balance aluminum, said first layer being applied to a surface of said core, and a covering layer disposed over said first layer, said covering layer being of an aluminum base alloy consisting essentially of, by weight, 6.8 to 8.2% silicon, 1.5 to 2.0% zinc, impurities of no more than 0.8% iron, 0.25% copper, 0.10% manganese and 0.15% total others, balance aluminum.

References Cited in the file of this patent

UNITED STATES PATENTS

| 1,570,893 | Hobbs | Jan. 26, 1926 |
|---|---|---|
| 1,572,503 | Pacz | Feb. 9, 1926 |
| 1,830,142 | Taylor | Nov. 3, 1931 |
| 1,869,996 | Bossert | Aug. 2, 1932 |
| 2,075,091 | Bonsack | Mar. 30, 1937 |
| 2,076,577 | Kempf | Apr. 13, 1937 |
| 2,312,039 | Hoglund | Feb. 23, 1943 |
| 2,354,006 | Gauthier | July 18, 1944 |
| 2,383,511 | Reynolds | Aug. 28, 1945 |
| 2,821,014 | Miller | Jan. 28, 1958 |

FOREIGN PATENTS

| 172,018 | England | Feb. 22, 1923 |
|---|---|---|
| 181,015 | England | May 31, 1922 |